United States Patent
Fleischer et al.

(10) Patent No.: US 8,186,599 B2
(45) Date of Patent: May 29, 2012

(54) COLLECTABLE GIFT CARDS

(75) Inventors: Howard Jay Fleischer, Ossining, NY (US); Carl E. Voigt, IV, Plainfield, IN (US)

(73) Assignee: Royalty Pros Licensing, LLC, Ossining, NY (US)

( * ) Notice: Subject to any disclaimer, the term of this patent is extended or adjusted under 35 U.S.C. 154(b) by 721 days.

(21) Appl. No.: 12/290,550

(22) Filed: Oct. 31, 2008

(65) Prior Publication Data

US 2009/0289123 A1 Nov. 26, 2009

Related U.S. Application Data

(60) Provisional application No. 60/983,967, filed on Oct. 31, 2007.

(51) Int. Cl.
*G06K 19/06* (2006.01)
(52) U.S. Cl. .................................... 235/492; 235/487
(58) Field of Classification Search .................. 235/375, 235/380, 382, 487, 492
See application file for complete search history.

(56) References Cited

U.S. PATENT DOCUMENTS

2008/0290596 A1* 11/2008 Bogle ........................... 273/139
2011/0101611 A1* 5/2011 Pompei et al. ................. 273/285
* cited by examiner

*Primary Examiner* — Karl D Frech
(74) *Attorney, Agent, or Firm* — Andrew F. Young, Esq.; Lackenbach Siegel, LLP

(57) ABSTRACT

A collectable gift card having a primary monetary value acceptable as legal tender for economic transactions and a secondary value providing a non-cash economic benefit to a consumer enhances the overall value of the card to both merchant and consumer. The primary value of the collectable gift card may be implemented through a standard gift card architecture or through other cash equivalent instruments such as credit cards, debit cards, cash cards or the like. The secondary value of the collectable gift card may be embodied as a gaming card for board games or other games of chance, or one card of a collectable set of cards, or as a puzzle piece forming a valuable image or game board. The collectable gift card may be a tangible object or a virtual card existing and tradeable in electronic form in devices such as cell phones, mp3 players, or on the Internet.

21 Claims, 23 Drawing Sheets

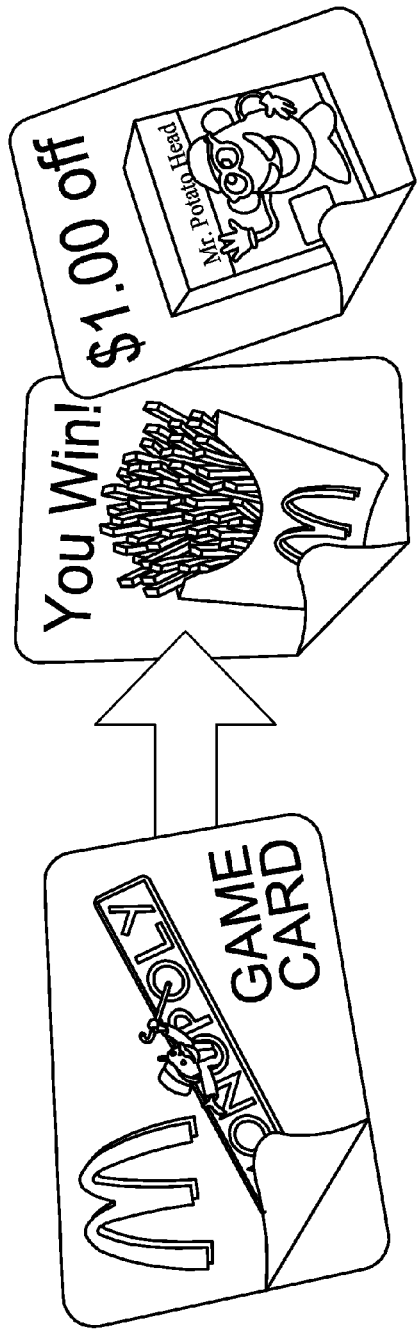

Peel-off labels are printed on the back and become immediately-redeemable coupons for food items, or money-off coupons for specific Hasbro toys.

*FIG. 11*

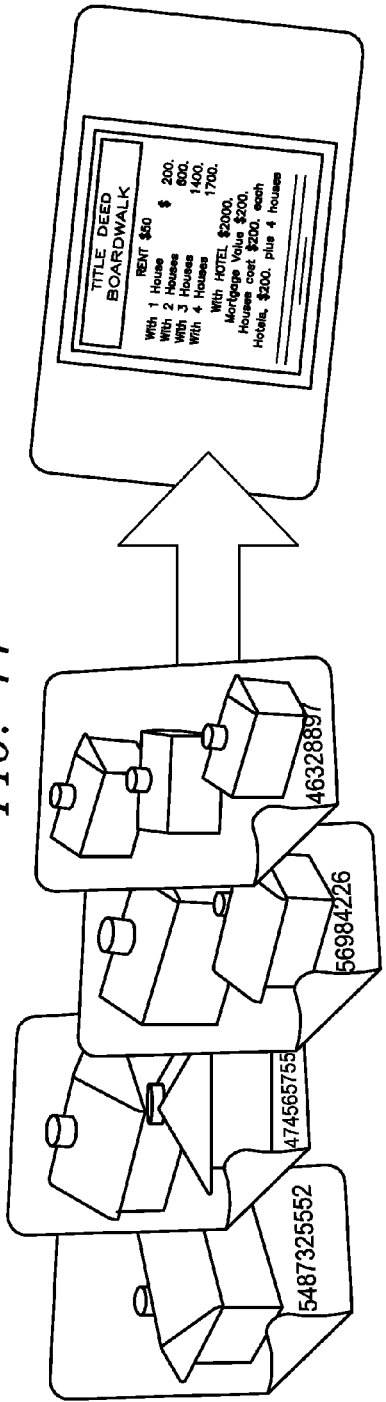

Some labels reveal houses or hotels which you can apply to any one of the cards you've collected, and increase their value exponentially, or save these labels until you collect more title deed cards of higher-valued property.

*FIG. 12*

 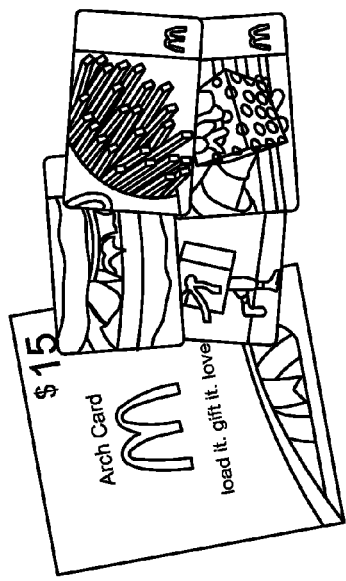
FIG. 13
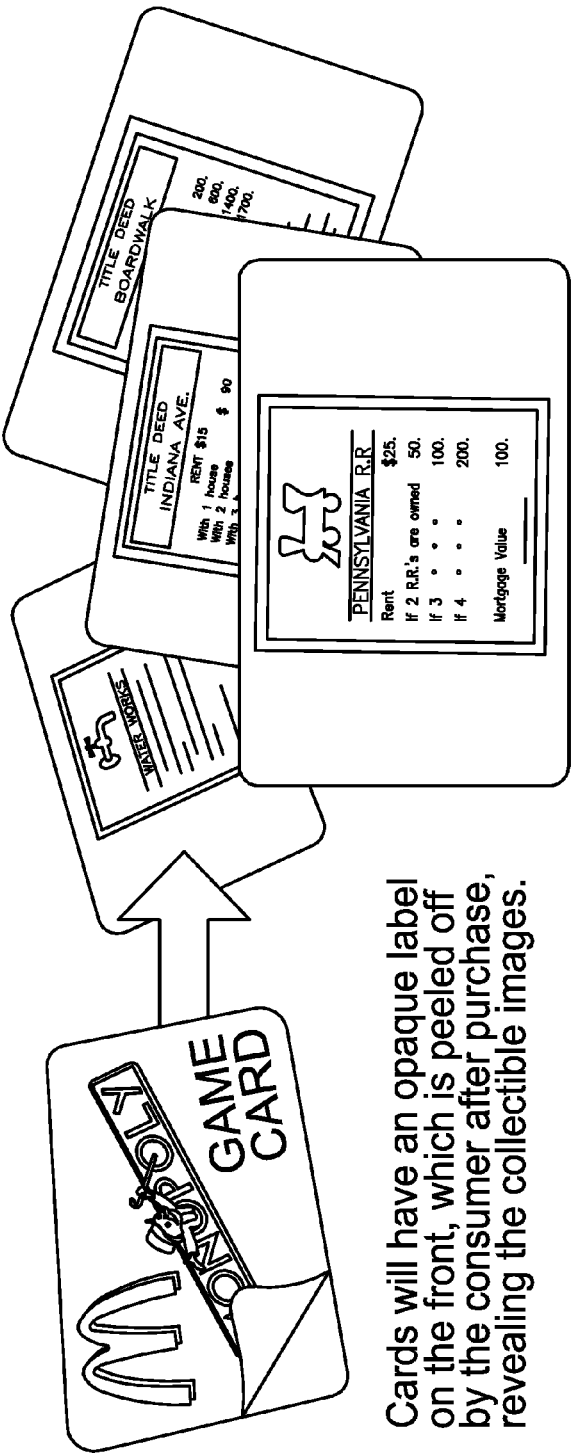
FIG. 14
Cards will have an opaque label on the front, which is peeled off by the consumer after purchase, revealing the collectible images.

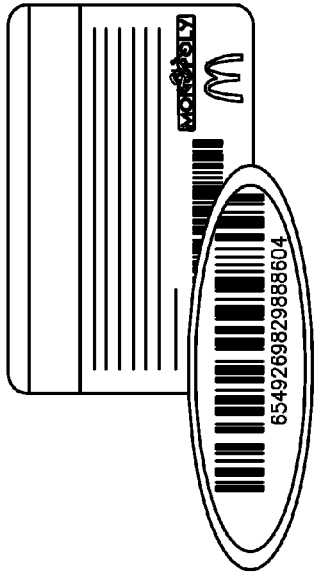
FIG. 15
Consumers go online and register the serial numbers of their cards.
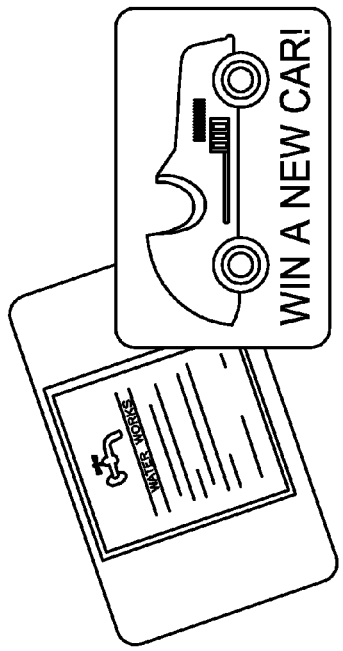
Some cards are rather common, while others are rare and hard to get.
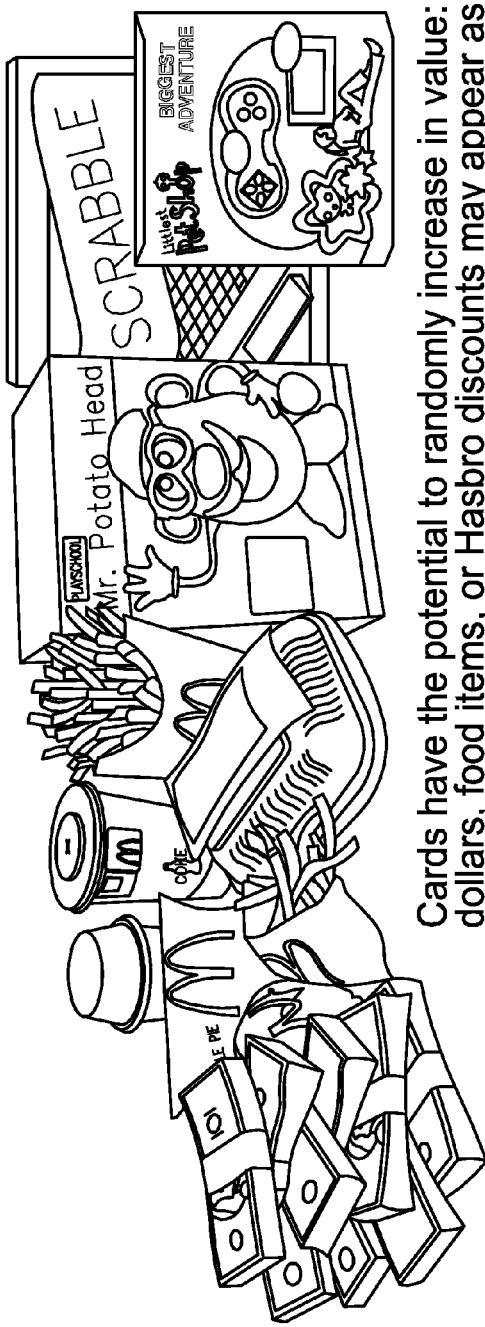
FIG. 16
Cards have the potential to randomly increase in value: dollars, food items, or Hasbro discounts may appear as consumers keep track of their cards online.

The internet link is key.

Players go to the McDonald's or Hasbro websites and play games. The more they play and the more successful they are, the more valuable their cards will become... it's up to the players how much they want to play and try to add value.

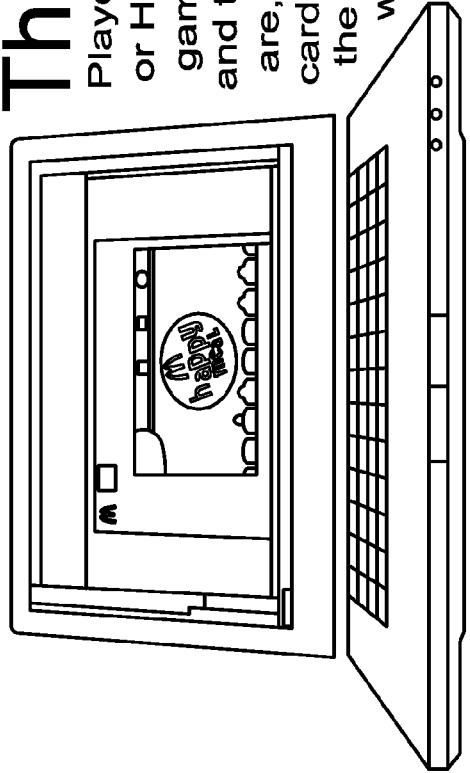
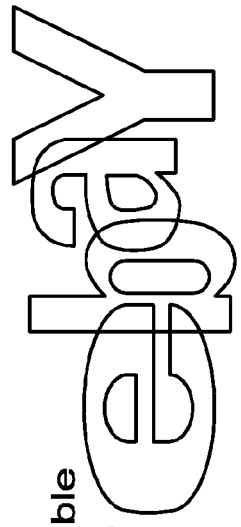

The internet allows players to drive their own benefit.

Online games could increase cards monetarily, or with prizes that correlate to the games they play; for example, they could earn higher entry level into other games, or establish themselves as an elite player/collector, which places them into a whole new level of money and prize winning potential Cards then become valuable for trading on the internet, on sites such as ebay.

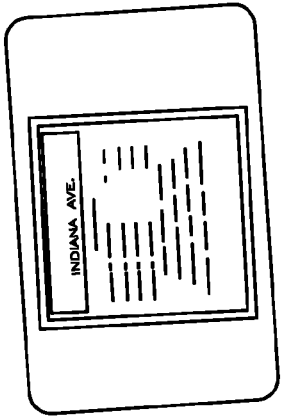

*FIG. 17*

Collectibility of cards can work in other ways.... images on individual cards can be pieces of larger puzzles, that when completed, can be redeemed for prizes.

There are special bonuses for collecting all the cards in a set: for example collect all 4 railroad cards and win a trip to the Railroaders Museum.

GIFT CARD + CONSUMER BENEFITS (KIDS & PARENTS)

+ Aspirational — kids would love to have a 'grown-up credit card'.

+ Empowering — kids have their own cash to spend.
— kids can earn online credits.

+ Auto Recharge — makes giving pocket money/allowance easy.

+ Social Currency/ Networking — link online friends and get online credits and benefits when shopping with the same retailer.

+ New, Exciting Card — worth more than its face value.

*FIG. 28*

GIFT CARD + TRADE BENEFITS

+ Advertising / merchandising platform with unique commercial value.
+ In-pack to in-pocket branding: A USD $1.00 card in 'toy' pack encourages additional purchase and up-sell because more cash will be added to the USD $1.00 at point of purchase generating retailer/brand revenue AND kid loyalty by generating more online credits.
+ The more purchases made, the more that's unlocked online, ie; more 'characters' for play and/or trading, and more 'levels'.
+ Storage of purchasing history.
+ 20% annual increase in gift card spending since 2005*.
+ 75% of consumers will receive at least one gift card this year*.
+ 31% increase in average transaction value when a gift card id used**.
+ 80% of purchases linked to brand on the card***.
+ 70% of kids aged 2-14 like gift cards****.

*FIG. 29*

COLLECTABLE GIFT CARDS

CROSS REFERENCES TO RELATED APPLICATIONS

This application claims priority benefit of a U.S. Provisional Application, Ser. No. 60/983,967 filed in the United States Patent and Trademark Office on Oct. 31, 2007, and entitled "COLLECTABLE GIFT CARDS".

STATEMENT REGARDING FEDERALLY SPONSORED RESEARCH

Not Applicable

REFERENCE TO APPENDIX

Not Applicable

BACKGROUND OF THE INVENTION

Field of the Invention

Prior to the embodiments outlined in this application, traditional gift cards (this is one example of a 'stored value card') have become a mainstream method of giving a monetary gift. As gift cards became more popular, different designs, logos, colors, and shapes of gift cards have been used to increase the aesthetics of the gift card or to identify a particular vendor or retail store. However, gift cards are still only as valuable as the monetary amount placed on them. As soon as the monetary value has been depleted the cards are thrown out by the consumer or retailer or recycled by the retailer or manufacturer.

Traditionally a collectible card is a small card, usually made out of cardboard or thick paper, which usually contains an image of a certain person (fictional or real) and a short description of the picture, along with other text (statistics, attacks, or trivia). They are usually associated with sports, cartoons, comic book characters, television series, or movie stills. They are also often used to play various games. These tend to use either fantasy subjects or sports as the basis for game play. Some commonly known collectible game cards are Digimon, Garbage Pail Kids, Pokémon, Webkinz, World of Warcraft, and Yu-Gi-Oh!.

The present invention combines the essential and desireable elements of the above devices and addresses the ability to increase the value of a 'collectable gift card' by creating a secondary value to the card such as making the gift cards collectable items that outlive their usefulness of storing monetary value amounts.

SUMMARY OF THE INVENTION

The embodiments outlined in this application disclose a collectable gift card whose overall value extends past any monetary amount placed thereon or associated therewith. Current gift cards drive a consumer into a retail location; either a brick and mortar store, an online location, or possibly a telephone or mail-in order, to redeem the value of the card by making a purchase or purchases until the card has no monetary value and then the gift card is discarded. One or more embodiments outlined herein create a collectable gift card with a secondary value on its own merit to drive the consumer to purchase the gift card not only because it has a monetary amount on the card but also because the collectable gift card has other intrinsic value in the eyes of the consumer.

BRIEF DESCRIPTION OF THE DRAWINGS

FIG. 11 is view of the series of steps to activate and view a peel-off label gift card;

FIG. 12 is view of multiple peel-off labels and a Monopoly board game card for interaction therewith;

FIG. 13 is a view of brand named gift cards which are also valuable as game cards in well known or popular games;

FIG. 14 is a view of brand named peel-off gift cards which after removing the peel-off label become valuable game cards in well known or popular games;

FIG. 15 is a view of brand named gift cards and a method of registering the card with the merchant;

FIG. 16 is a view of multiple methods for increasing the value of issued cards;

FIG. 17 is a view of the method in which consumers can used their gift cards on the internet and increase the value of the card;

FIG. 28 is a table of benefits to the consumer and his family for using the collectable gift card;

FIG. 29 is a table of business benefits to the merchandiser for issuing, tracking, redeeming, enhancing and honoring the collectable gift card in the stream of commerce.

DETAILED DESCRIPTION OF THE EMBODIMENTS

Figure 1:
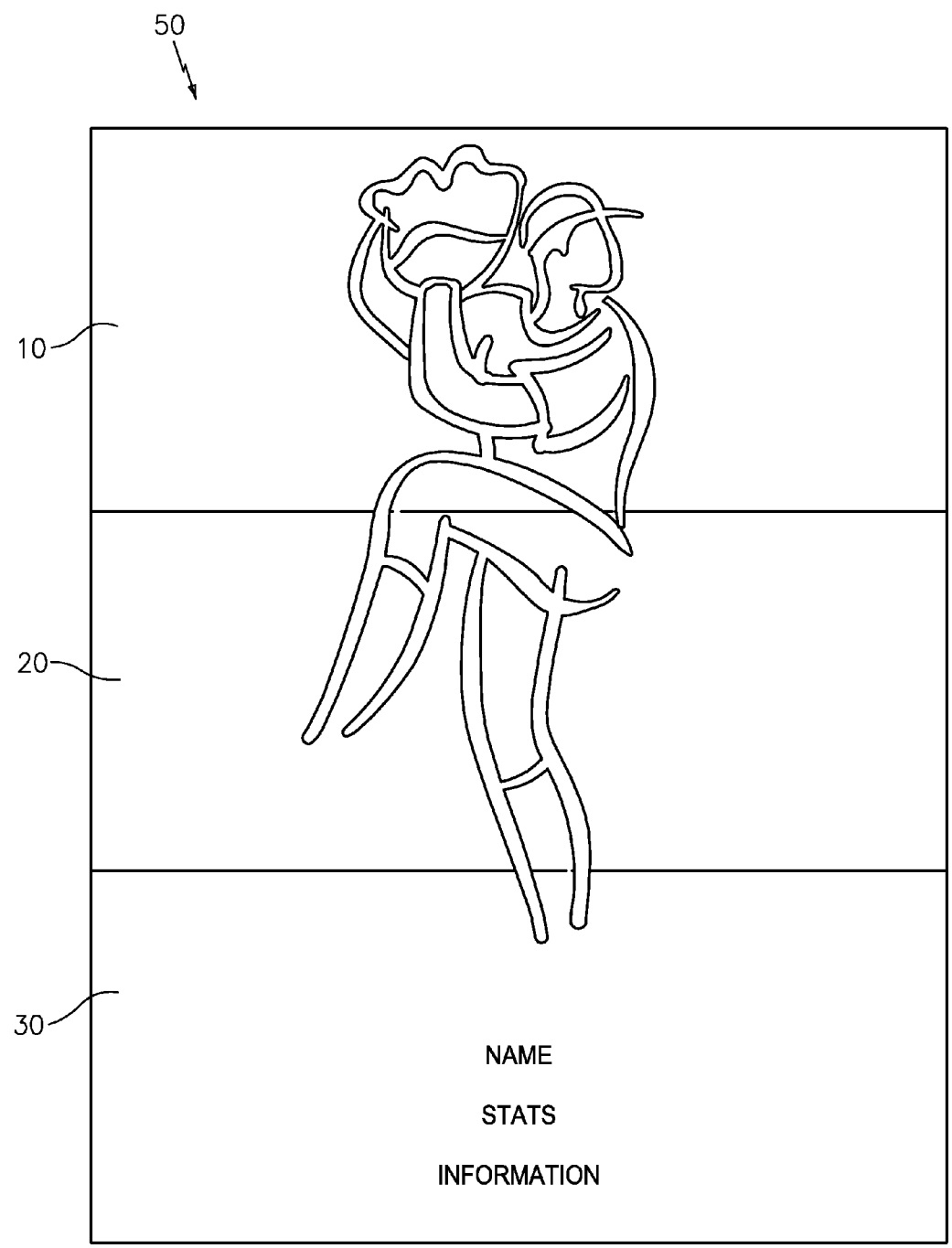
FIG. 1 is a top plan view of an assembly of three individual gift cards designed to form a complete ordered set.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or the embodiments illustrated.

The essence of this invention is to combine the traditional value and use of 'trading cards' with the standard 'monetary use only' gift card rendering a novel product for use by a merchant and consumer in the stream of commerce.

Although in this application we usually refer to the invention as an 'improved gift card', 'collectable gift card' or just 'gift card', we are referring to any kind or type of 'stored-value card' which represents any of several kinds of money instruments, including but not limited to a cash card whereby the funds are contained on the card using encryption or other security technology, or a card whereby money is on deposit with the issuer, or a debit card, and or a credit card. Further the card may be issued in the name of an identified account holders, or the card are may be anonymous.

The term stored-value card does not necessarily mean the funds data is physically stored on the card although it may be. In many cases the data is maintained on computers affiliated with the card issuer. The value associated with the card can be accessed using information from a magnetic stripe embedded in the card; or using radio-frequency identification (RFID); or by entering a code number, printed on the card, into a numeric keypad, computer, and or telephone including voice means, or any combination of the above.

For example the monetary portion of this invention may be embodied in many different types of instruments as previously mentioned. The actual apparatus for containing or representing the funds attached to the card include the typical merchant issued gift card, but also include monetary instruments such as debit cards, cash cards, credit cards, prepaid cards, RFID cards, open system cards, and closed system cards. It should also be noted that the apparatus does not have to be a physical card but could be any device capable of containing and communicating this information including but not limited to music/video (mp3) players or iPod devices, cell phones, memory sticks, watches, or any other device having non-volatile memory and a means for communication such as mechanical, electrical, infra-red, laser, or electromagnetic radiation (RF). Thus the 'gift card' can be completely electronic whereby the primary value is stored in a portable electronic vault transportable by electronic means with all the attendant security measures to prevent the funds from being diverted, stolen or lost. The secondary value is rendered through imagery such as electronic figures, characters, tokens and the like.

Although the preferred embodiment disclosed is a gift 'card' which is often a flat thin sheet(s) of material and usually considered to be two dimensional, it is another aspect of this invention that the apparatus may be more obviously three dimensional such as a toy figure, Lego block, book, or Game Boy for example. All of the foregoing monetary methods can be fabricated into such a three dimensional object. Further it is another embodiment of this invention that the 3D figure or object may be provided to the consumer in separate but related pieces which can be collectable as a set or even interconnectable such as a modular toy space station, or any other child's toy which can be manufactured in separate modules for later assembly into a whole toy. For example a popular toy figure may be distributed in parts such as head, torso, and limbs which can be assembled into a complete figure once collected by the consumer.

Figure 2:
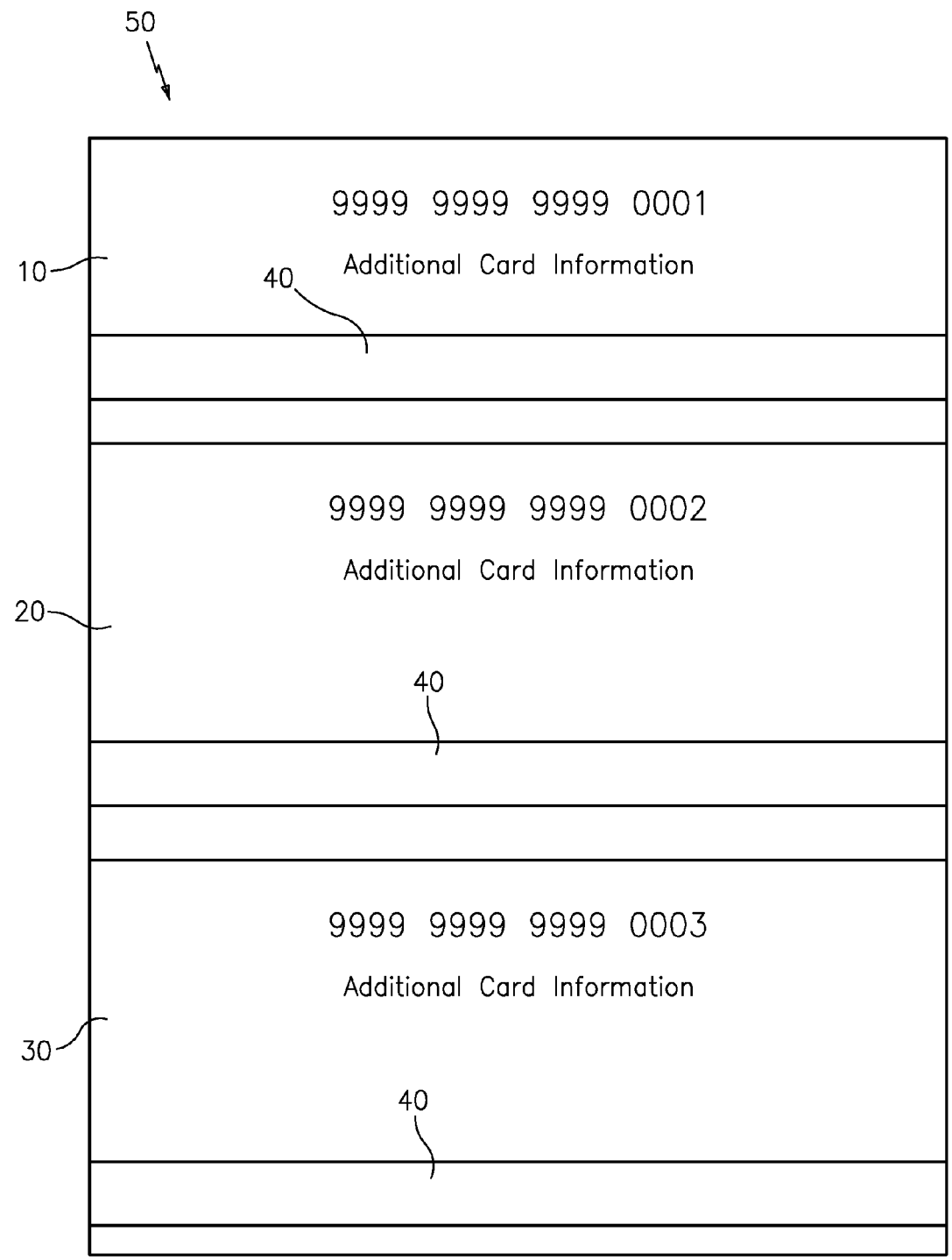
FIG. 2 is a bottom plan view of FIG. 1 showing the backsides of the three individual gift cards designed to form a complete ordered set.

Referring now to FIG. 1, there are shown three collectable gift cards 10, 20, and 30, each depicting an image or a portion of an image that when assembled in a particular order depicts a large image 50. Each gift card 10, 20, and 30, would be purchased separately and may have a particular monetary value placed thereon. As shown in FIG. 2, the backside of the gift cards would include information and a strip 40 that would hold the monetary value and any additional information necessary to use the separate gift cards at a retail store for purchasing items. However, unlike the prior art, the present embodiment provides gift cards that are now a component to a larger image and which retain a collectable value. The series of cards may have any image placed thereon. However, the collectable value provides the owner of the completed set or series with a secondary function that permits the gift cards to be traded or sold. In addition, while the embodiment shows three gift cards assembled to create the larger image 50, the number of gift cards used may be more or less.

It is further contemplated, that the component gift cards may be assembled to form a game. For example, when the gift cards are assembled together, the image on the front thereof, could form a game board which the consumer could use with separately purchased or obtained game board pieces. It is yet further contemplated, that the gift cards may include a front portion having various images and corresponding gaming information to form when multiple gift cards are used together a collectible card game or trading card game that uses strategic game play and various other rules well known or specifically designed for the game to play against two or more players. Moreover, the collectible card game gift cards may be a special card that can be used in a pre-existing collectible card game.

Figure 3:
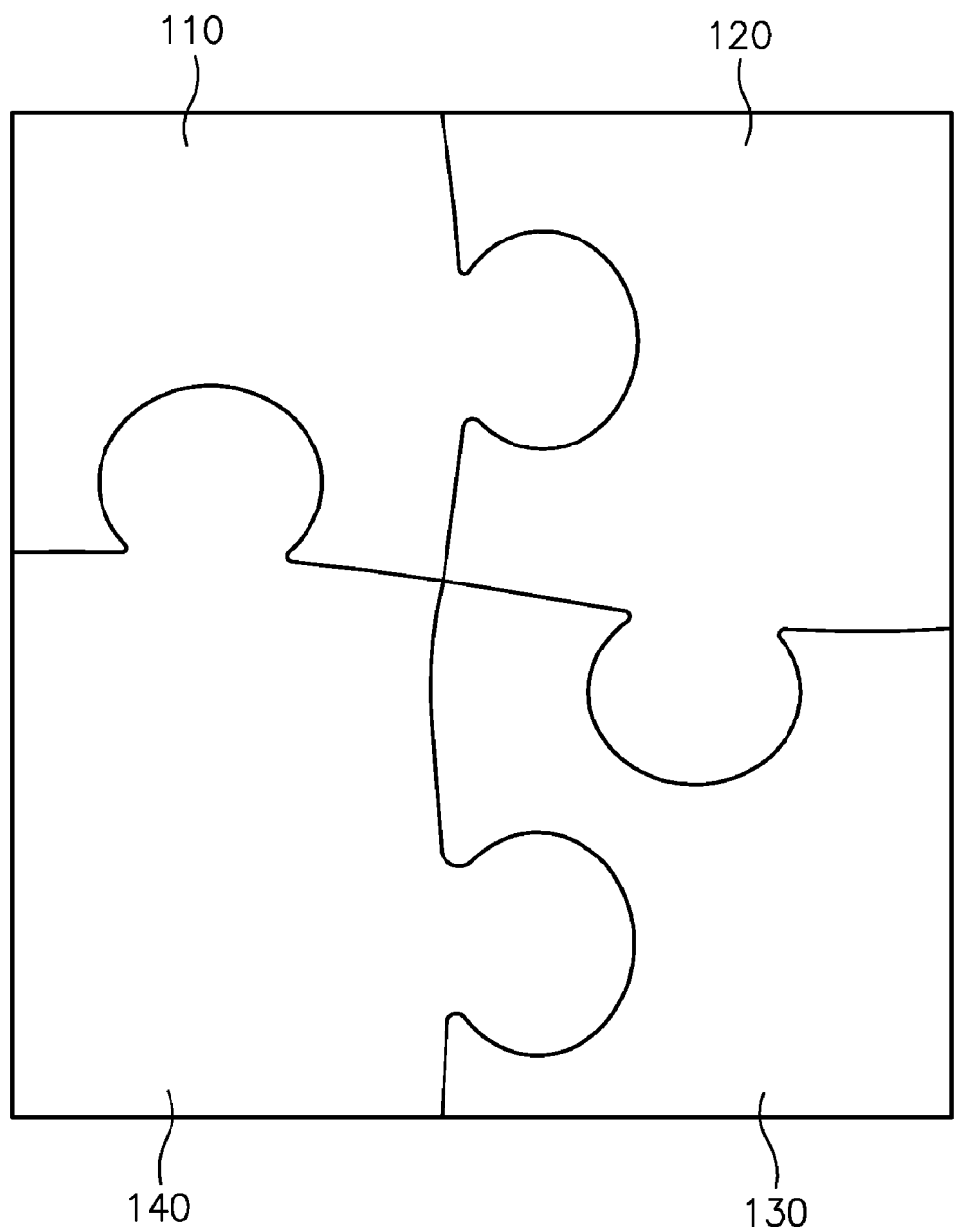
FIG. 3 is a top plan view of an assembly of four individual gift cards designed as puzzle pieces meant to form a completed puzzle rendering an image, textual information or a combination thereof.

Referring now to FIG. 3, there is shown a set or series of gift cards 110, 120, 130, and 140 which would be purchased separately and which have edges that form into specific shapes such that the gift cards assemble which each other, forming a puzzle or a game. The image on the front side of the gift cards may be specifically created or designed for a particular purpose or may simply be that to which the consumer may find appealing to assembly. Similarly to the above, the back side of the gift cards would include information and strip to contain the monetary value and any additional information necessary for the proper use of the gift cards. The number of gift cards used to create the puzzle or game may be more or less then what has been depicted.

Figure 4:
FIG. 4 is a top plan view of a gift card incorporating additional information and consumer incentives.

Referring now to FIG. 4, additional gift cards 200 are also contemplated to provide secondary functions beyond the mere holding of a monetary value, for example, the gift card which could be a normal Visa, Master Card, or other major credit card gift card and used at any retail may include a bonus if the gift card is used to purchase products at a specific store. The specific store would in that instance be considered a sponsor of the gift card. The bonus may be an additional discount off of the purchasing price of the item or may include a prize bonus, such as a give away item.

Figure 5:
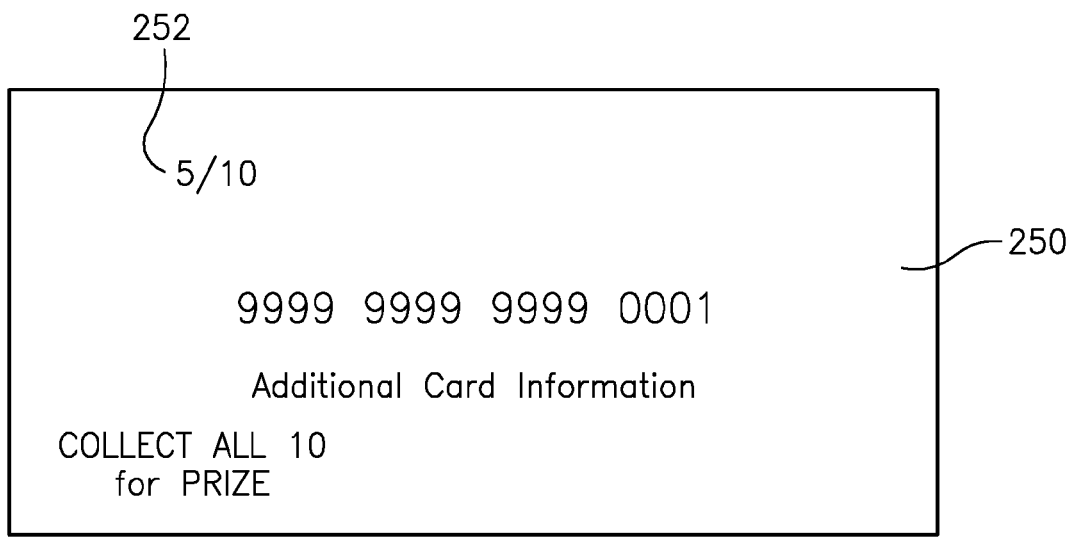
FIG. 5 is a top plan view of a gift card incorporating special limited edition information or serial identification information.
Figure 6:
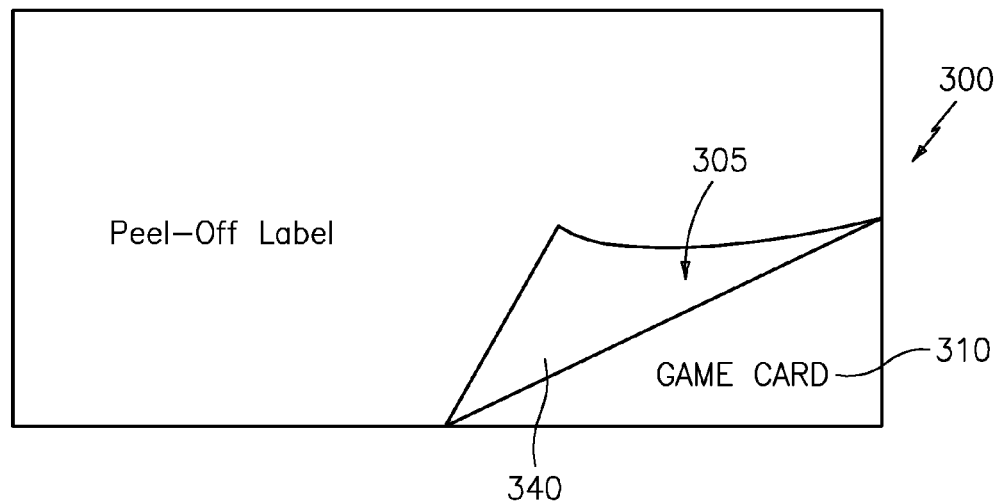
FIG. 6 is a top plan view of a gift card incorporating a peel-off label.
Figure 7:
FIG. 7 is a bottom plan view of FIG. 6 showing the backside of the peel-off label gift card incorporating magnetic strips and or barcodes or other machine readable information.
Figure 8:
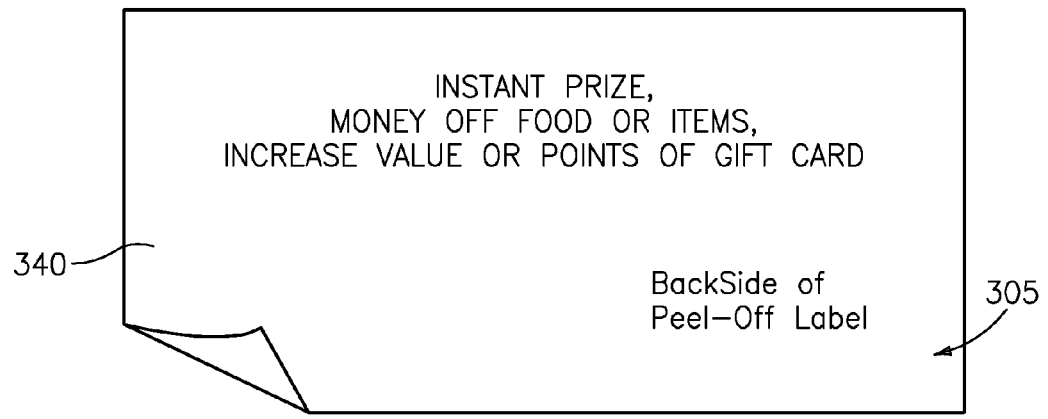
FIG. 8 is a top plan view of the backside of the peel-off label from FIG. 6 revealing information not visible until the peel-off label was removed from the gift card.
Figure 9:
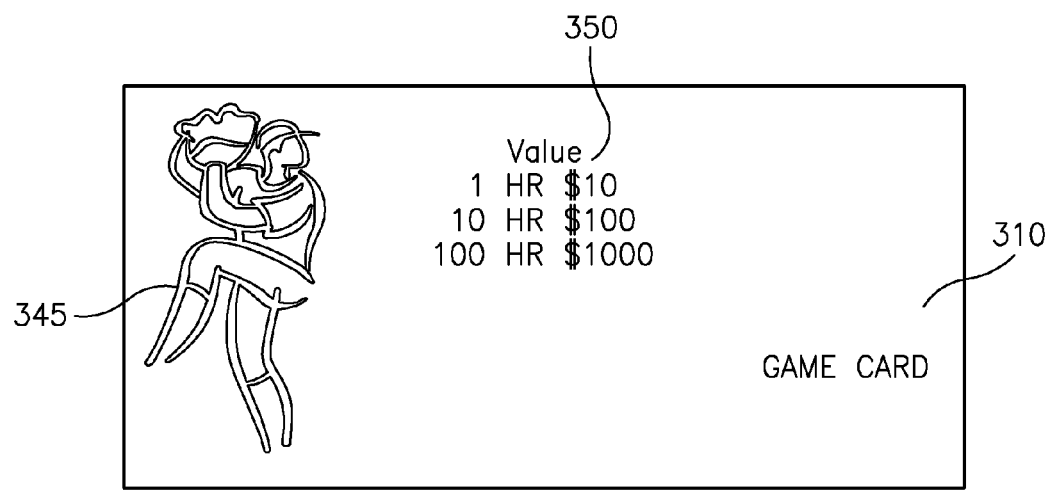
FIG. 9 is a top plan view of the frontside of the gift card from FIG. 6 revealing information not visible until the peel-off label was removed from the gift card.

Referring now to FIG. 5, additional gift cards 250 may be provided to form a series or special limited edition, released in a series. Where the consumer would be willing to collect all of the gift cards 250 in the series in order to exchange or present all of the gift cards in the series for a prize. The gift cards 250 may include markers 252 to indicate to the consumer which card in the series the consumer has and how many gift cards in total is needed to complete the series.

It is further contemplated to provide a secondary value to the gift cards by providing a manner and mechanism in which the gift cards could be redeemed for a discounted value. For example, allowing a consumer that received a gift card from a specific store that the consumer does not normally shop in would be allowed to redeem the gift card for a slightly discounted value of cash, gifts, or other gift card.

It is yet further contemplated to provide a multiple gift cards which could be assembled into a flat or 3-dimensional product. As to the flat or 3D assembly version of a collectable gift card; a merchant or manufacturer may take one of an unknown item, popular toy, gaming piece, electronic device or other attractive item and produce it in a modular fashion comprising a set of parts which could thereafter be assembled as they are collected into a complete functioning whole. At least one piece of the modular 'gift card' would contain the monetary value portion and the merchant may choose to have the modular unit function with increasing economic performance as the consumer assembles the 'gift card' piece by piece. Special economic benefits could attribute to the 'gift card' upon completion such as prizes, discounts or an increase in cash value.

Still yet further contemplated by the embodiments provided herein is a gift card that includes a sweepstake number that if identified could be traded or redeemed for a prize.

Referring now to FIGS. 6-9, a gift card 300 may be provided with a peel off label 305 to reveal a game card 310 under the peel off label 305. The backside 320 of the gift card 300 could further include the information strip 325 that would hold the monetary value and any additional information necessary to use the separate gift cards at a retail store for purchasing items. The backside 320 could also include a serial line 330 and or a barcode line 335.

The peel off label 305 may further include a front side 340 that is secured to the game card side 310 of the gift card 300 and which is not revealed until the peel off label 305 is removed. The peel off label 305 may be secured in any well known manner, for example, the peel off label could hide the entire side of the card or be only a portion of the card. The peel off label could be attached with any well known adhesive or static attachments as well as have a perforated separation.

The front side 340 of the peel off label 305 could be provided with additional redeemable coupons. The label 305 would be redeemable for food, prizes, or money. In addition the label 305 could be used in conjunction with the game card to increase the monetary or collectable value of the game card 310. For example, the game card 310 could include a picture area 345 and a value related area 350 that discloses the collectable value of the game card 310. The collectable value of the game card may or may not dictate the actual monetary value of the gift card 300 that would be loaded onto the gift card during the initial purchase.

In but one example, the game card 310 could be directed to a baseball game with pictures of current athletes. The value related area 350 could indicate that a game card with 1 home run has a first value of $10. However, if the game card is associated with more home runs, the value increases, such that a game card with 10 home runs has a second value higher then the first value. More premium game cards picturing different athletes could increase the value at higher rates. In this example, the peel-off label could include the value of the card by allowing the user to add a home run to the game card. In another example, the game cards could be directed to a popular board game with the pictures representing spots on the board game and the value related area representing the costs associated with the spots on the board game. The peel-off label could in such an example represent a token, for which for collection of tokens increases the value of the spot.

The gift cards could further be registered on a website. Using the serial number 330, a user could register the gift card which could track the collectable and/or monetary value of the card. The peel-off labels could further include serial numbers. The user logged onto the website, could enter the serial number of the peel-off label and apply the points or value of the peel-off label to any specific registered game card owned by the user. The website could also include on-line games that award points, value, or allow higher entry into other gaming levels that the user could also apply to a registered game card. The collectable value of the game card in these instances increases allowing the user to trade or sell the game card to other people.

Figure 10:
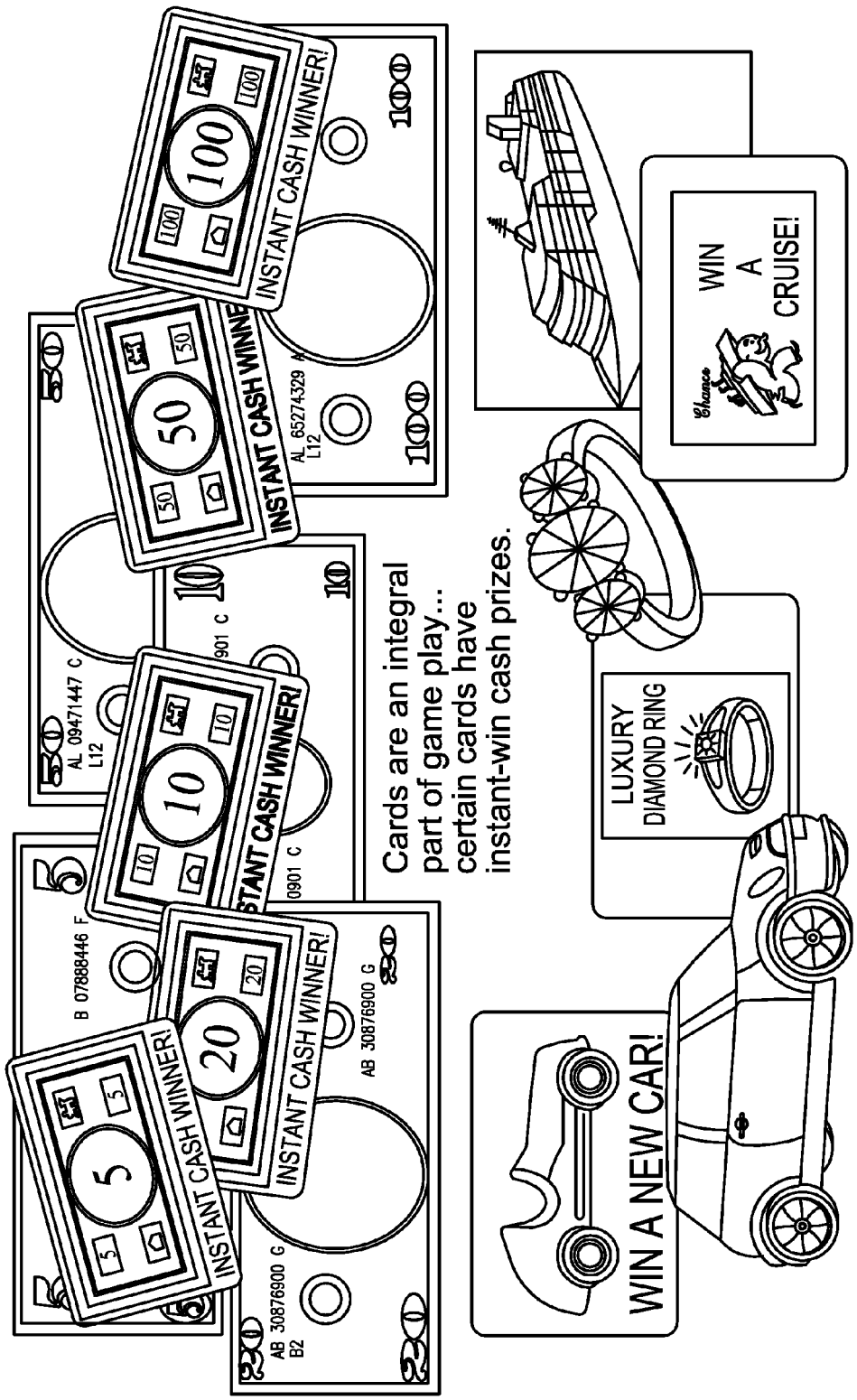
FIG. 10 is a collection of gift cards that have additional intrinsic value associated with games.

Referring to FIG. 10 a variety of gift card fronts are shown. Some of the cards are instant winners for use in popular or well known games. Others are redeemable for the prize stated. Yet other cards are for a chance to win as in a sweepstakes contest or drawing.

Referring to FIG. 11 a peel-off gift card is shown with cross branding benefits. The gift card is for playing a board game while the peel off label provides a cash benefit at a different merchant.

Referring to FIG. 12 another peel-off gift card is shown with enhancer benefits to be applied to popular game cards. The peel-off label can act as a multiplier of the game card it is applied to.

Referring to FIG. 13 a set of gift cards is shown which can thereafter become game cards by the peel-off mechanism previously described or other packing methods which may or may not reveal the game card enclosed.

Referring to FIG. 14 a gift card is shown which identifies the target game but does not reveal the gaming benefit until the peel-off label is removed. This method heightens the consumer's mystery and excitement of acquiring such a card.

Referring to FIG. 15 a set of gift cards is shown in which some cards are common and less valuable while other cards are rare and very valuable. Further the consumer may go on the Internet and register each card by entering the serial number.

Referring to FIG. 16 a set of prizes is shown which can be assigned or attributed to cards randomly through the online registration of the gift card. A merchant can offer time limited promotions, prizes or other benefits to incite the consumer towards some desired economic activity such as entering a retail establishment or purchasing certain products or just exercising the card in a specific manner whether online or in the retail establishment.

Referring to FIG. 17 an Internet activity such as gaming is shown. Card holders may increase the value of their card(s) by engaging in predetermined activities sponsored by the merchant. For example, playing a specific game for a specific time period or accumulating certain point thresholds may entitled the consumer to certain economic benefits such as real cash added to the card, discounts, instant prizes, and or special discounts. Cards may thereafter be traded by consumers or sold on sites such as Ebay.

Figure 18:
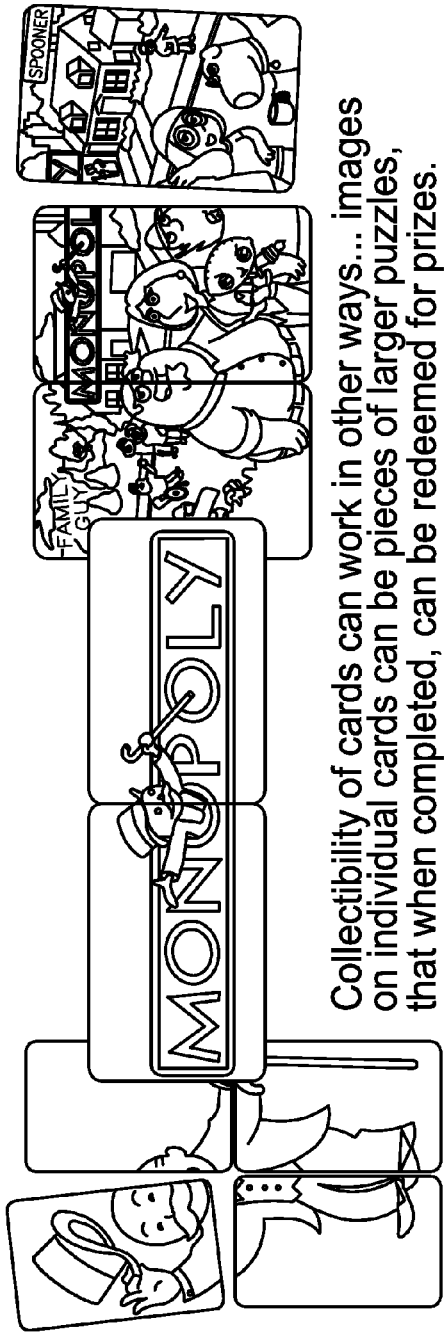
FIG. 18 is a view of how multiple gift cards can be collected to form a completed image or puzzle.

Referring to FIG. 18 a collectable set of gift cards is shown which when assembled form a completed image or game board. The cards may be similarly shaped so as to simply abut one another or they may be shaped as puzzle pieces with matching interlocking protrusions and voids. One the consumer has acquired the whole set, he is entitled to an economic benefit as determined by the merchant. It should be noted that an economic benefit may be either an increased cash value to the card or the customer's account as well as some discount in a transaction to acquire material goods, including giveaways.

Figure 19:
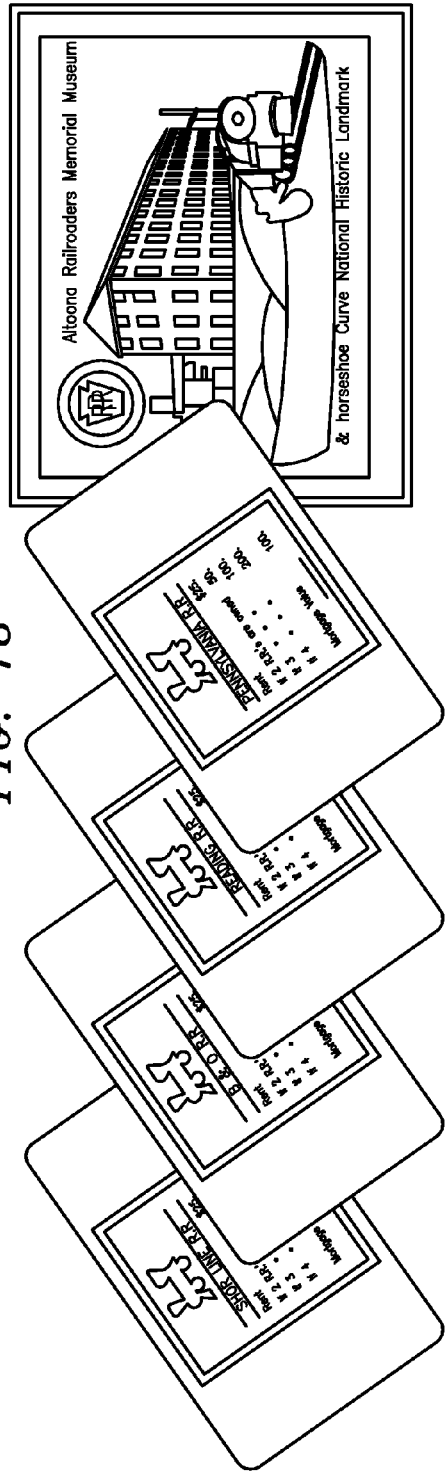
FIG. 19 is a view of how multiple gift cards can be collected to form a completed set.

Referring to FIG. 19 a set of gift cards is shown which form a collectable set and in which the consumer reaps an economic reward for achieving the completion of the set. The benefit may take any form of the merchants choosing such as free tickets to an event, or a free trip or cruise.

Figure 20D:
FIG. 20D is a top view of a series of individual theme-type collectable gift cards designed to form a completed set when collected.
Figure 20C:
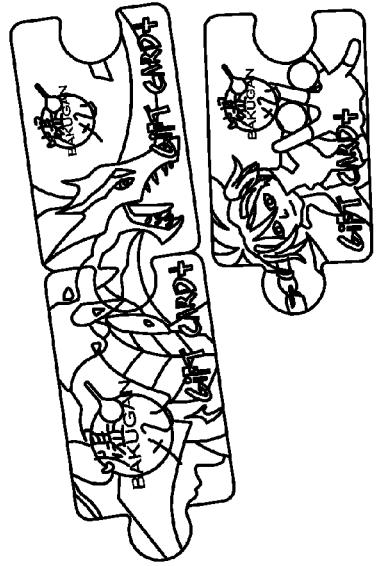
FIG. 20C is a top view of a series of individual puzzle-type collectable gift cards designed to form a completed image when assembled together.
Figure 20A:
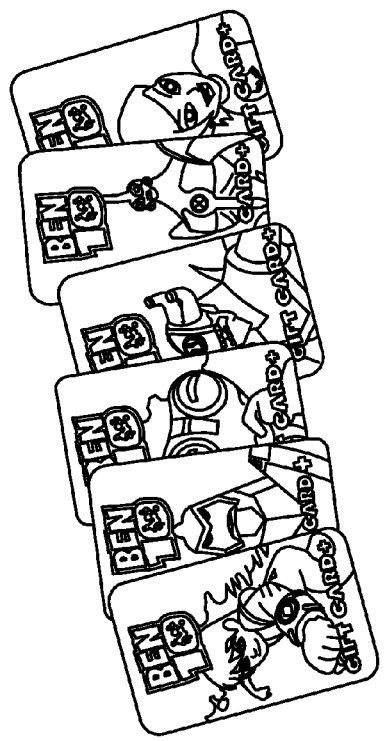
FIG. 20A is a top view of a series of individual collectable gift cards designed to form a set.

Referring to FIG. 20A a set of collectable gift cards is shown which comprise a collectable series based on a popular character or theme. Each card has its own individual monetary value, however total value of the set of cards will usually increase once the full set is acquired. This economic benefit motivates the consumer to acquire the full set of cards.

Figure 20B:
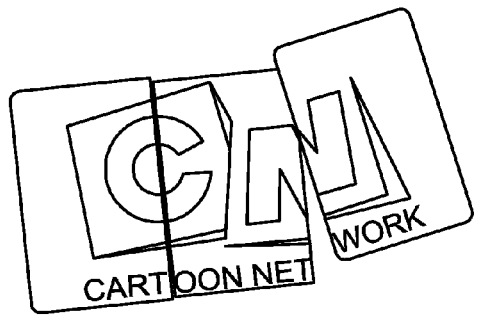
FIG. 20B is a top view of a series of individual collectable gift cards designed to form a completed image when assembled together.

Referring to FIG. 20B a set of gift cards is shown which when physically assembled as a whole form a unique singular image. Again an economic benefit accrues to the consumer upon acquisition of the complete set.

Referring to FIG. 20C a set of gift cards is shown which are shaped as puzzle pieces and when physically assembled as a whole form a unique singular image. An economic benefit accrues to the consumer upon acquisition of the complete set.

Referring to FIG. 20D a set of gift cards is shown which are targeted to well known cartoon characters. These cards may be issued as stand alone cards or have benefits attributable to a set of cards defined by the merchant. The merchant may determine different sets are entitled to economic benefits so as to create a promotional effort to focus attention on new or existing products, television shows or movies. An economic benefit accrues to the consumer upon possession or acquisition of the complete set.

Figure 21:
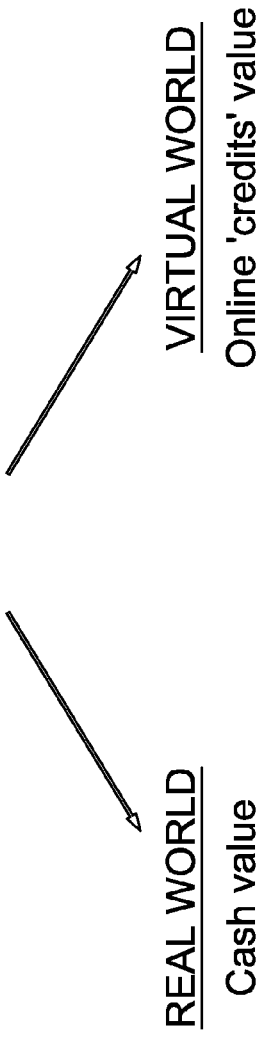
FIG. 21 is a flow chart depicting the different species of value that a collectable gift card can possess.

Referring to FIG. 21 a chart is shown to distinguish between the primary value (cash) and the secondary value (gaming or non-cash economic benefit) of the collectable gift card.

Figure 22:
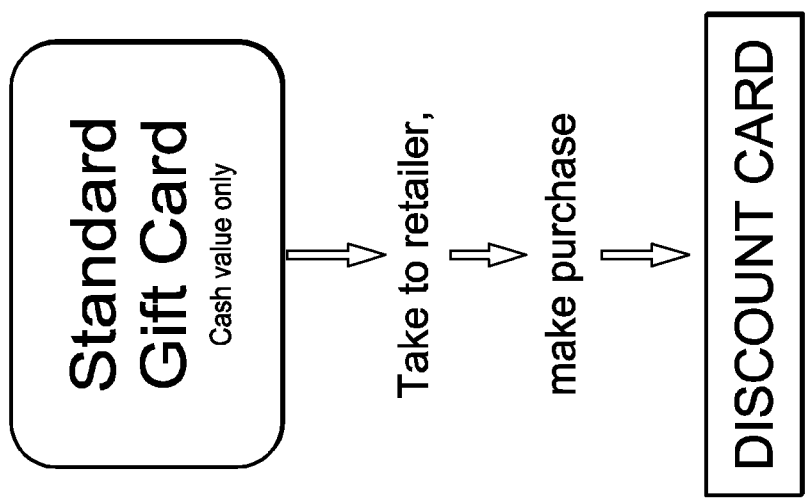
FIG. 22 is a flow chart depicting the current method of use for a standard gift card.

Referring to FIG. 22 a flow chart is shown depicting the normal life cycle of the existing standard gift card. No economic benefit to the consumer exists beyond the cash value of the card. The consumer has no reason to retain the card once the cash value is expended and thus the merchant loses an opportunity to be present in the consumer's life beyond the purchasing transaction that extinguishes the card.

Figure 23:
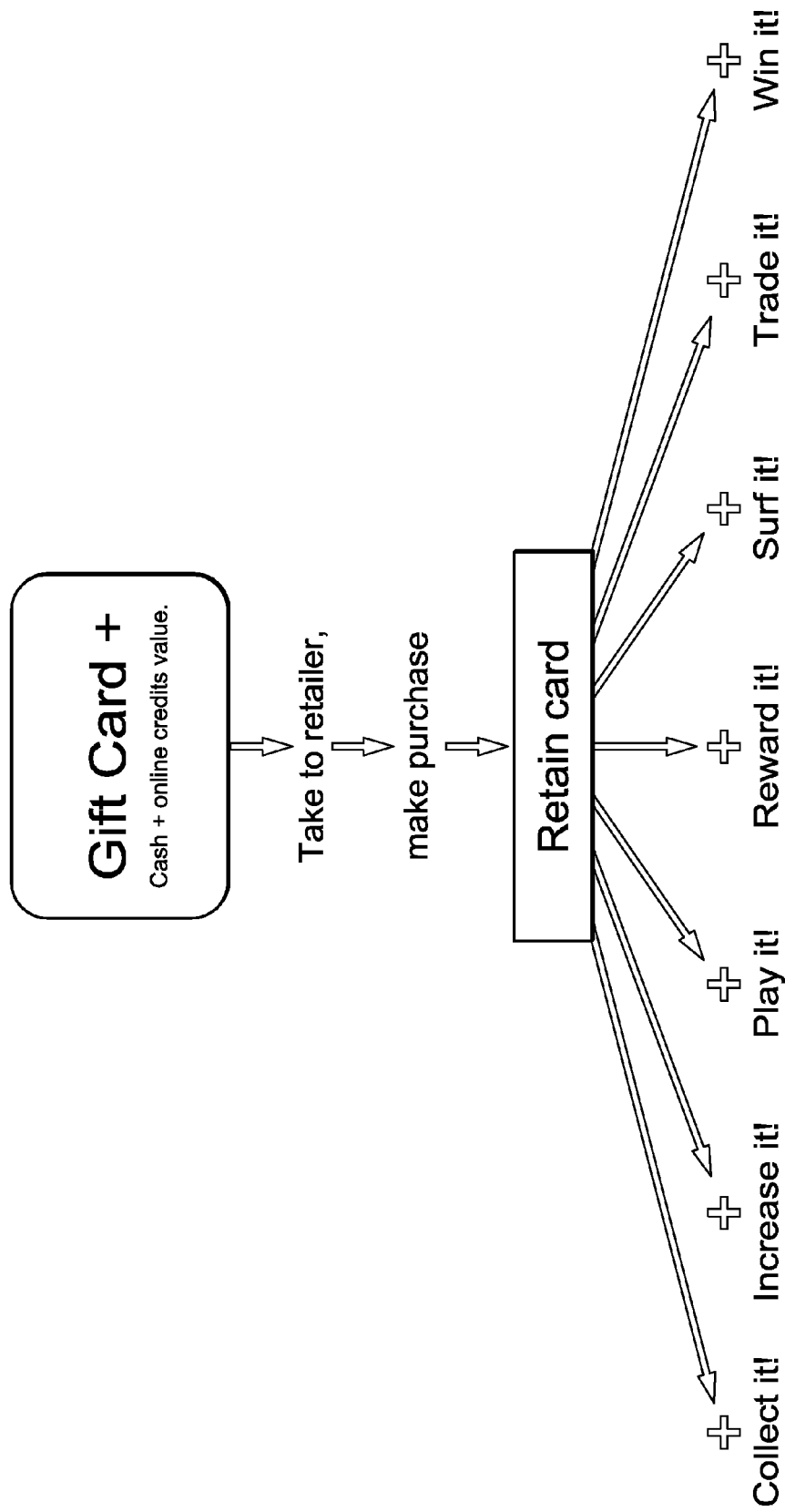
FIG. 23 is a flow chart depicting the method of use for a collectable gift card.

Referring to FIG. 23 a flow chart is shown depicting the normal life cycle of the novel collectable gift card. A secondary value as described herein motivates the consumer to keep the gift card as he realizes future economic benefits will emanate from possession and use of the card.

Figure 24:
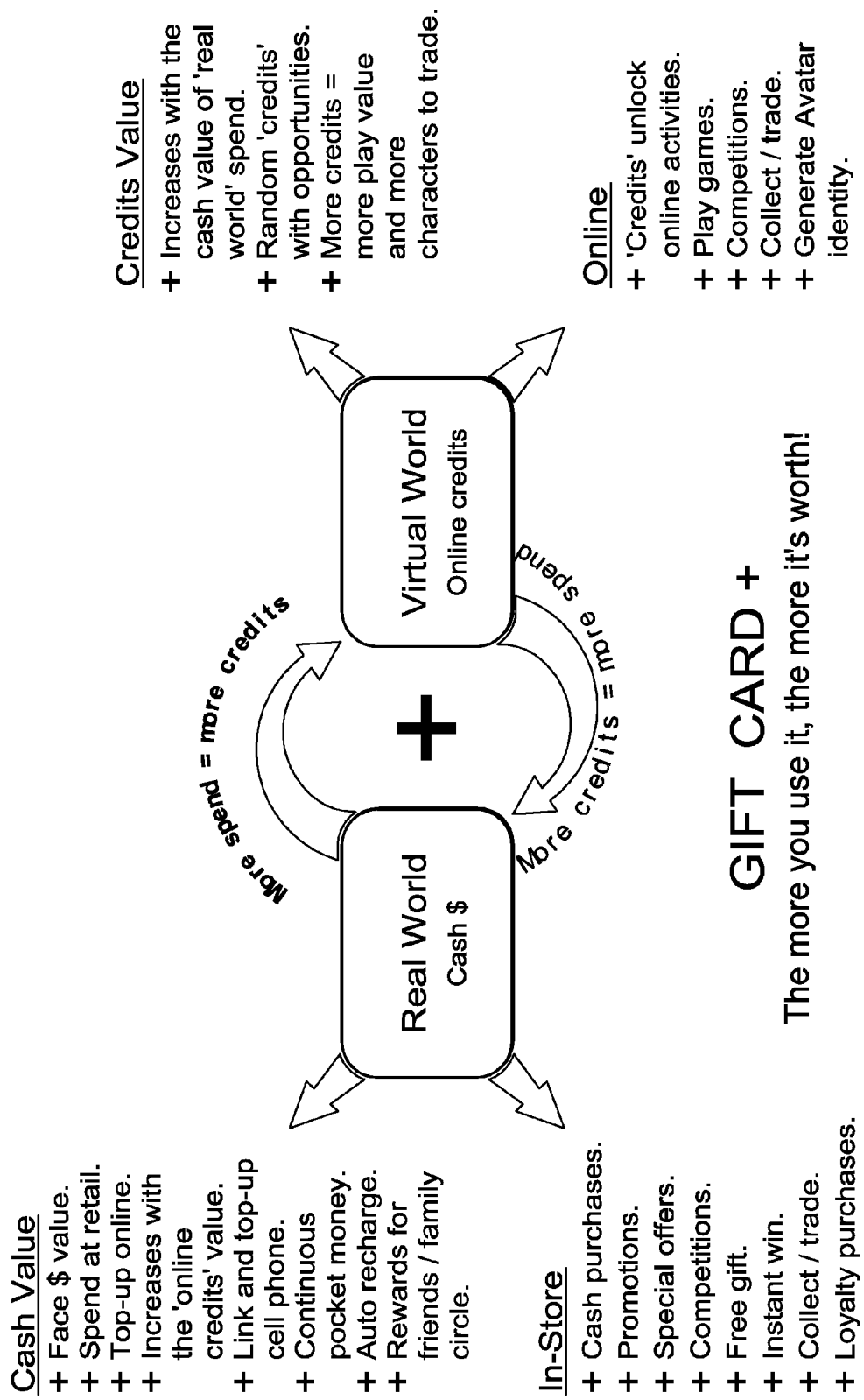
FIG. 24 is a schematic chart depicting the various pathways for redeeming, increasing, and or using one of or both the primary value (cash) and or the secondary value of a collectable gift card.

Referring to FIG. 24 is a schematic chart depicting the primary value (cash) and the secondary value (non-cash economic benefits) of the gift card. Merchants are able to design very specific cards to motivate the consumer into desired economic behavior. Further the merchant is able to track the conumer's behavior in ways that were untrackable by conventional means.

Figure 25:
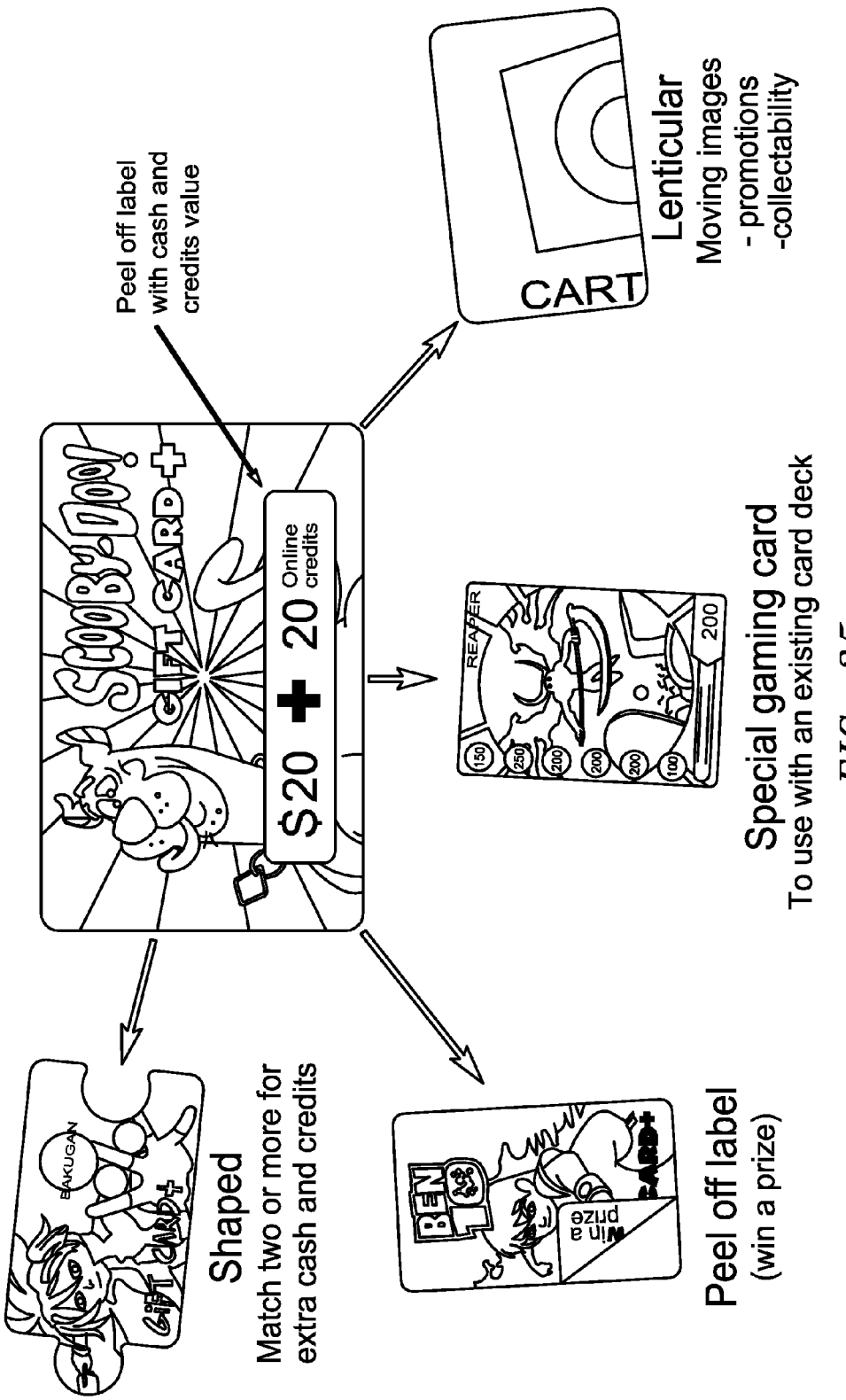
FIG. 25 is a frontside view of several different cards indicating of various methods for secondary value usage, redemption and play.

Referring to FIG. 25, various card fronts are shown. It should be noted that cards may contain holographic and lenticular imagery to provide simulated animation or motion effects.

Figure 26:
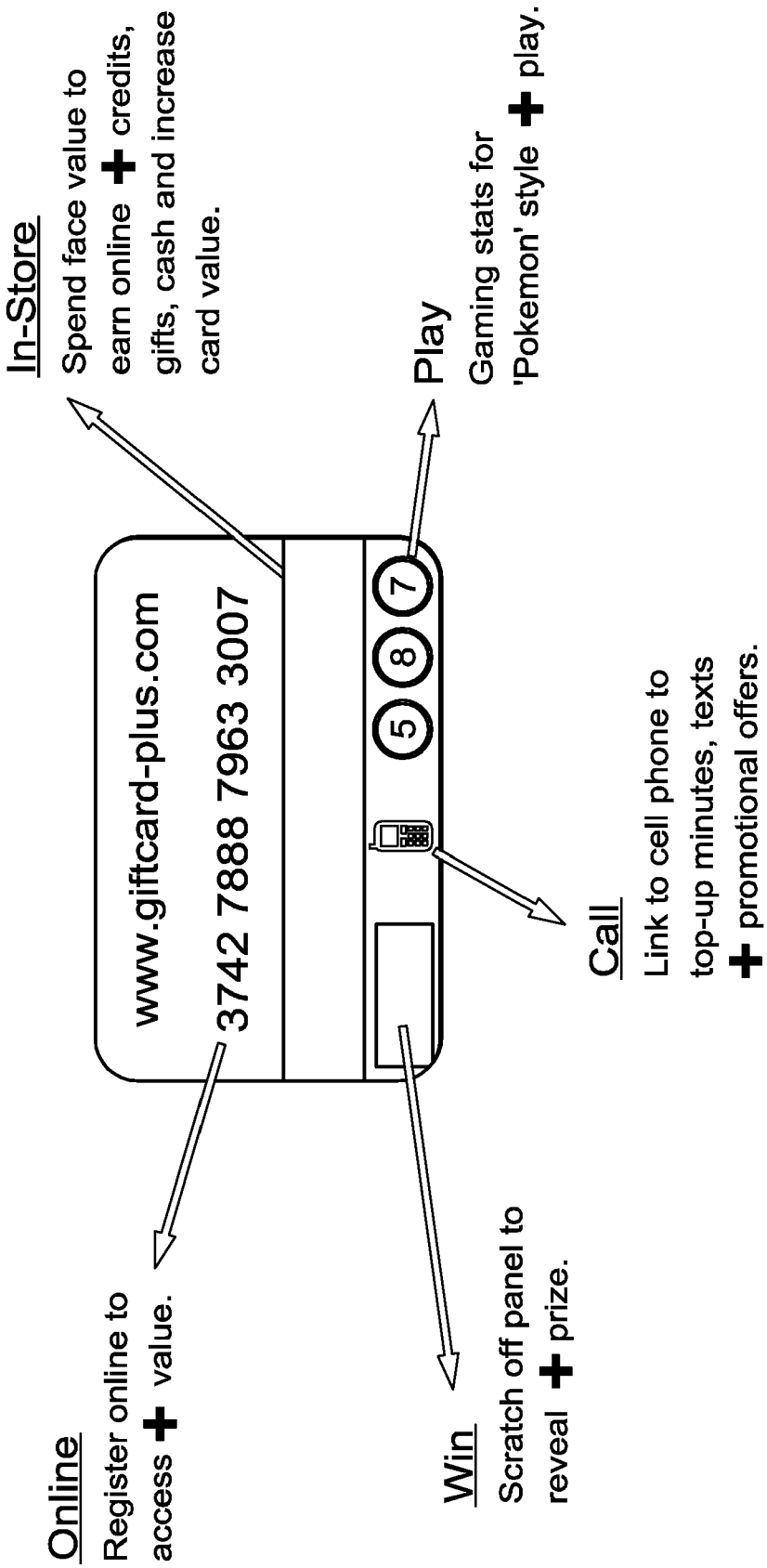
FIG. 26 is a backside view of a collectable gift card displaying multiple information fields and various methods for secondary value usage, redemption and play.

Referring to FIG. 26 a collectable gift card backside is shown. Various types of information may be located here for the merchant's and consumer's benefit. Among those informations are a registration number to identify the card, recharge methods, scratch off panels, and a magnetic stripe for cash dispersement.

Figure 27:
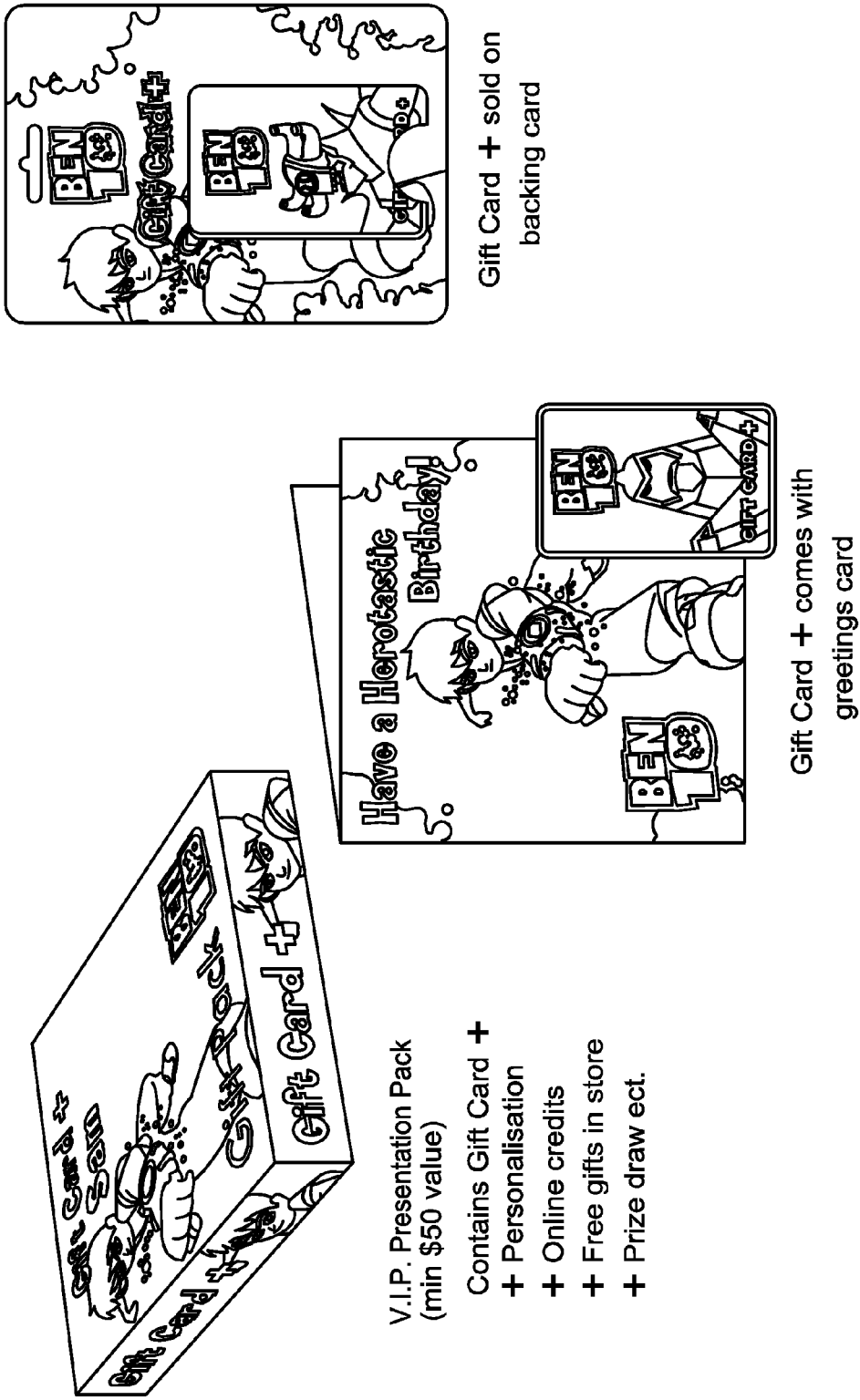
FIG. 27 is a series of different apparatus for packaging and delivering the collectable gift card to a consumer.

Referring to FIG. 27 various packaging mechanisms are shown. The gift cards may be contained in product packaging, or with a conventional greeting card, or sold alone on a backing card.

Referring to FIG. 28 a table of benefits is to the consumer (parents and children) is shown.

Referring to FIG. 29 a table of benefits is to the merchant is shown.

Figure 30:
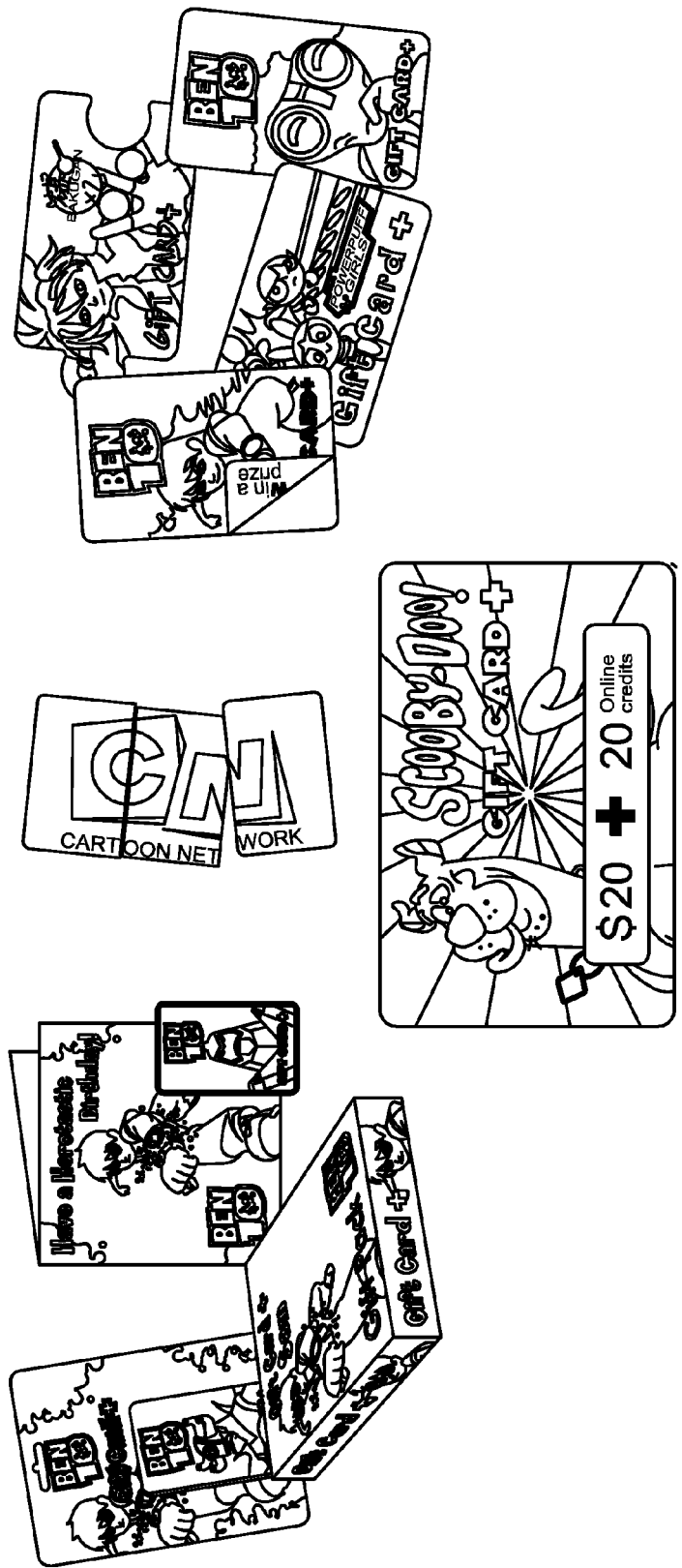
FIG. 30 is a overview of the various types of and methods of use for the collectable gift card.

Referring to FIG. 30 a summary of some of the embodiments and benefits of the collectable gift card is shown.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred.

We claim:

1. A collectable gift card having a primary cash value and a secondary non-cash value comprising:
   a writable and readable non-volatile memory for receiving, maintaining and dispersing said cash value;
   a unique identification number;
   said secondary value comprising a printed image on a front side of said card;
   whereby said printed image is an authentic playing piece in one of a board game, parlor game, or a card game;
   whereby said printed image is one of a selection of multiple sub-images; and whereby a collection of all the sub-images renders a certain whole image.

2. A collectable gift card as in claim 1 whereby the shape of each gift card containing a sub-image is of the same physical size and shape.

3. A collectable gift card as in claim 2 whereby the physical assembly of each gift card with a unique sub-image in an ordered format renders the whole image.

4. A collectable gift card as in claim 3 whereby possession of the entire set of gift cards rendering a whole image increases the economic value of the gift cards.

5. A collectable gift card as in claim 1 whereby the shape of each gift card containing a sub-image is that of a predetermined puzzle piece with uneven edges.

6. A collectable gift card as in claim 5 whereby the physical assembly of a set of gift cards containing all of the sub-images in an ordered format renders the whole image.

7. A collectable gift card as in claim 6 whereby possession of the entire set of gift cards rendering a whole image increases the economic value of the gift cards.

8. A collectable gift card as in claim 1 whereby said identification number is entered into a online database by a recipient of the gift card;

said secondary value increasing in accordance with a predetermined merchant algorithm related to specific consumer activity; and said activity including one or more of online gaming; survey participation; online ordering; and or physical presence by the consumer in a related brick and mortar establishment.

9. A collectable gift card as in claim 1, whereby said primary cash value is provided by a first merchant and said secondary value is associated and redeemable with a second merchant.

10. A collectable gift card as in claim 9, whereby said second merchant honors the primary value of the gift card.

11. A collectable gift card having a primary cash value and a secondary non-cash value comprising:
   a writable and readable non-volatile memory for receiving, maintaining and dispersing said cash value;
   a unique identification number;
   said secondary value comprising a printed image on a front side of said card; and
   said collectible gift card belonging to a predetermined set of gift cards and whereby possession of the entire set of gift cards increases the economic value of the gift cards.

12. A collectable gift card as in claim 11 whereby said identification number is entered into a online database by a recipient of the gift card;
   said secondary value increasing in accordance with a predetermined merchant algorithm related to specific consumer activity;
   said activity including one or more of online gaming; survey participation; online ordering; and or physical presence by the consumer in a related brick and mortar establishment.

13. A collectable gift card as in claim 11 whereby said primary cash value is provided by a first merchant and said secondary value is associated and redeemable with a second merchant.

14. A collectable gift card as in claim 13 whereby said second merchant honors the primary value of the gift card.

15. A collectable gift card having a primary cash value and a secondary non-cash value comprising:
   a writable and readable non-volatile memory for receiving, maintaining and dispersing said cash value;
   a unique identification number;
   said secondary value comprising a printed image on a front side of said card; and
   further comprising: a peel-off label attached to a front side of said gift card and obscuring said image.

16. A collectable gift card as in claim 15 and further comprising:
   a front side and a back side of said peel-off label;
   said backside of said peel-off label initially adhered to said front side of said gift card;
   said front side and selectively said back side of said peel-off label containing secondary value information.

17. A collectable gift card as in claim 15 whereby said peel-off label secondary value is combinable in an enhancing manner with a playing card or piece of a board game.

18. An electronic collectable vault having a primary cash value and a secondary non-cash value comprising:
   a portable electronic vault containing said primary value whereby by said cash value may be increased or decreased in accordance with an economic cash transaction;
   an accompanying virtual image displayable on an electronic screen designed for imagery identifying the type of card and its intended playing use.

19. A collectable vault as in claim 18 whereby said portable electronic vault is electronically transportable to others in a trade or other economic transaction.

20. An electronic collectable gift card having a primary cash value and a secondary non-cash value comprising:
   a portable electronic gift card containing said primary value whereby by said cash value may be increased or decreased in accordance with an economic cash transaction;
   an accompanying virtual image displayable on an electronic screen designed for imagery identifying the type of card and its intended playing use.

21. A collectable gift card as in claim 20 whereby said electronic collectable gift card is electronically transportable to others in a trade or other economic transaction.

\* \* \* \* \*